United States Patent [19]

Horikawa

[11] Patent Number: 4,868,388

[45] Date of Patent: Sep. 19, 1989

[54] RADIATION IMAGE READ-OUT APPARATUS

[75] Inventor: Kazuo Horikawa, Kanagawa, Japan

[73] Assignee: Fuji Photo Film Co., Ltd., Kanagawa, Japan

[21] Appl. No.: 212,156

[22] Filed: Jun. 24, 1988

Related U.S. Application Data

[63] Continuation of Ser. No. 39,417, Apr. 17, 1987.

[30] Foreign Application Priority Data

Apr. 17, 1986 [JP] Japan ............................ 61-88766

[51] Int. Cl.$^4$ .......................... G03B 42/00; G01T 1/00
[52] U.S. Cl. ............................... 250/327.2; 250/484.1
[58] Field of Search ............... 250/327.2 D, 327.2 E, 250/327.2 F, 327.2 G, 484.1 B

[56] References Cited

U.S. PATENT DOCUMENTS 4,258,264 3/1981 Kotera et al. .................... 250/484.1

FOREIGN PATENT DOCUMENTS 0148410 7/1985 European Pat. Off. ......... 250/484.1
11395 2/1981 Japan .............................. 250/327.2
88936 5/1985 Japan .............................. 250/484.1

Primary Examiner—Constantine Hannaher
Attorney, Agent, or Firm—Sughrue, Mion, Zinn, Macpeak & Seas

[57] ABSTRACT

A radiation image read-out apparatus is constituted for exposing a stimulable phosphor sheet carrying a radiation image stored thereon to stimulating rays which cause the stimulable phosphor sheet to emit light in proportion to the stored radiation energy, and photoelectrically detecting the light emitted by the portion of the stimulable phosphor sheet exposed to the stimulating rays by use of a photodetector to obtain an image signal representing the radiation image. The apparatus comprises a sharpness adjuster for adjusting sharpness of a visible image reproduced based on the image signal, a light amount detector for detecting the light amount of stimulating rays, and a control circuit for receiving the output of the light amount detector, and controlling the sharpness adjuster in accordance with a decrease in the light amount of stimulating rays so that sharpness of the visible image is decreased.

4 Claims, 2 Drawing Sheets

RADIATION IMAGE READ-OUT APPARATUS

This is a continuation of application Ser. No. 39,417, filed Apr. 17, 1987.

BACKGROUND OF THE INVENTION

1. Field of the Invention

This invention relates to a radiation image read-out apparatus for reading out a radiation image stored on a stimulable phosphor sheet by exposing the stimulable phosphor sheet to stimulating rays which cause it to emit light in proportion to the stored radiation energy, and photoelectrically detecting the emitted light.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such a visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device.

A He-Ne laser, a semiconductor laser, or the like is used as the stimulating ray source for emitting stimulating rays. However, as is well known, the light output of such a laser gradually decreases with the passage of operation time. When the light amount of stimulating rays thus decreases, stimulation energy for the stimulable phosphor sheet becomes low and, as a result, the graininess of the visible radiation image reproduced based on the read-out image signal deteriorates (i.e. becomes more perceptible). Consequently, the reproduced visible image becomes rough, and the image quality thereof becomes low.

SUMMARY OF THE INVENTION

The primary object of the present invention is to provide a radiation image read-out apparatus wherein the image quality of a reproduced image is prevented from deterioration caused by a decrease in light output of stimulating rays.

Another object of the present invention is to provide a radiation image read-out apparatus which is advantageous from the economical viewpoint.

The present invention provides a radiation image read-out apparatus for exposing a stimulable phosphor sheet carrying a radiation image stored thereon to stimulating rays which cause the stimulable phosphor sheet to emit light in proportion to the stored radiation energy, and photoelectrically detecting the light emitted by the portion of the stimulable phosphor sheet exposed to the stimulating rays by use of a photodetector to obtain an image signal representing the radiation image, wherein the improvement comprises the provision of:

(i) a sharpness adjustment means for adjusting sharpness of a visible image reproduced based on said image signal, (ii) a light amount detecting means for detecting the light amount of said stimulating rays, and (iii) a control means for receiving the output of said light amount detecting means, and controlling said sharpness adjustment means in accordance with a decrease in the light amount of said stimulating rays so that said sharpness of said visible image is decreased.

The graininess of an image tends to deteriorate as the sharpness is improved. Therefore, when the sharpness is decreased in accordance with the present invention as the light amount of stimulating rays becomes low, it is possible to prevent the deterioration of graininess caused by a decrease in the light amount of the stimulating rays. Accordingly, with the radiation image read-out apparatus in accordance with the present invention, even though the light output of the stimulating ray source decreases with time, it is possible to reliably prevent the graininess of the reproduced visible radiation image from deteriorating, and to maintain the high image quality of the reproduced visible image. As a result, it becomes possible to substantially prolong the service life of the expensive stimulating ray source such as a laser beam source, and to decrease the running cost of the radiation image read-out apparatus.

DESCRIPTION OF THE PREFERRED EMBODIMENTS

The present invention will hereinbelow be described in further detail with reference to the accompanying drawings.

Figure 1:
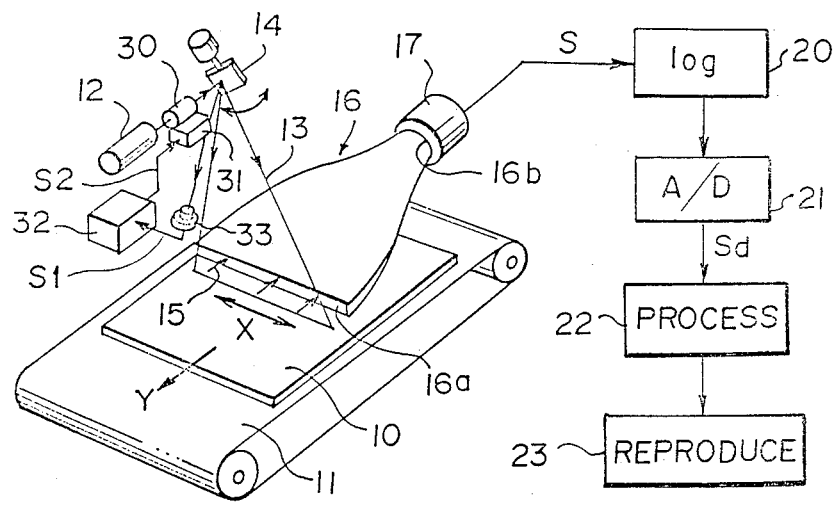
FIGS. 1 and 2 are schematic views showing embodiments of the radiation image read-out apparatus in accordance with the present invention.

Referring to FIG. 1, a stimulable phosphor sheet 10 carrying a radiation image of an object such as the human body stored thereon by being exposed to a radiation such as X-rays passing through the object is conveyed by a sheet conveyance means 11 comprising an endless belt or the like in a sub-scanning direction as indicated by the arrow Y. A laser beam 13 is emitted as stimulating rays by a laser beam source 12, and the beam diameter of the laser beam 13 is adjusted to a desired value by a zoom beam expander 30. The laser beam 13 is then deflected by a galvanometer mirror 14 swinging both ways, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 is guided by a light guide member 16 and is photoelectrically detected by a photomultiplier 17 acting as a photodetector.

The light guide member 16 is made by the forming of a light guiding material such as an acrylic plate, and has a linear light input face 16a positioned to extend along the beam scanning line on the stimulable phosphor sheet 10, and a ring-shaped light output face 16b closely contacted with a light receiving face of the photomultiplier 17. The emitted light 15 entering the light guide member 16 from its light input face 16a is guided through total reflection inside of the light guide member 16, emanates from the light output face 16b, and is received by the photomultiplier 17. In this manner, the amount of the emitted light 15 carrying the radiation image information is detected by the photomultiplier 17.

An analog output signal (read-out image signal) S generated by the photomultiplier 17 is amplified by a logarithmic amplifier 20, and then digitized by an A/D converter 21 with a predetermined scale factor. A digital read-out image signal Sd thus obtained is sent to an image reproducing apparatus 23 such as a CRT or a light beam scanning recording apparatus via an image processing device 22, and the radiation image which was stored on the stimulable phosphor sheet 10 is reproduced as a visible image by the image reproducing apparatus 23.

As mentioned above, when the light output of the laser beam source 12 decreases with time, the graininess of the visible radiation image reproduced by the image reproducing apparatus 23 deteriorates. Features of the radiation image read-out apparatus in accordance with the present invention for preventing the problem will be described hereinbelow. The zoom beam expander 30 is operated by an actuator 31 which is controlled by a control circuit 32. The control circuit 32 receives an output (light amount signal) S1 of a light amount detector 33 which detects the light amount of the deflected laser beam 13 at a position outside of the effective scanning region. The control circuit 32 generates an actuator operation control signal S2 in accordance with the light amount signal S1, and controls the actuator 31 so that the beam diameter of the laser beam 13 is increased as the light amount of the laser beam 13 decreases When the beam diameter of the laser beam 13 is increased in this manner, the stimulable phosphor sheet 10 is scanned by the beam of stimulating rays having a larger diameter and the sharpness of the visible radiation image reproduced from the stimulable phosphor sheet 10 becomes low. As a result, as mentioned above, deterioration of the graininess of the reproduced visible image is restricted.

In order to adjust the beam diameter of the laser beam 13 as stimulating rays, instead of using the zoom beam expander 30 and the actuator 31, a collimator lens (which is incorporated in the laser beam source 12 in the embodiment of FIG. 1) for collimating the laser beam 13 may be disposed for movement in the optical axis direction, and may be moved in said direction by an actuator, thereby changing the collimated condition of the laser beam 13.

Figure 3:
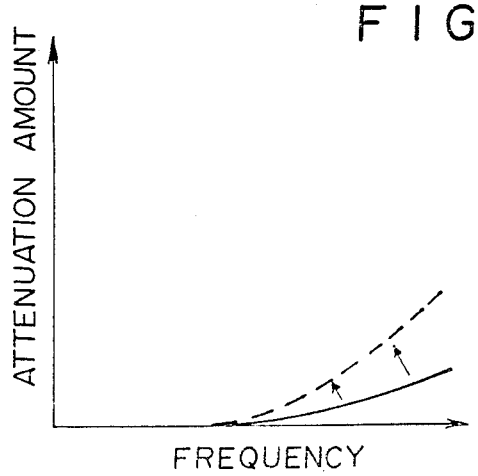
FIG. 3 is a graph showing control of characteristics of a low-pass filter used in accordance with the present invention.
Figure 2:
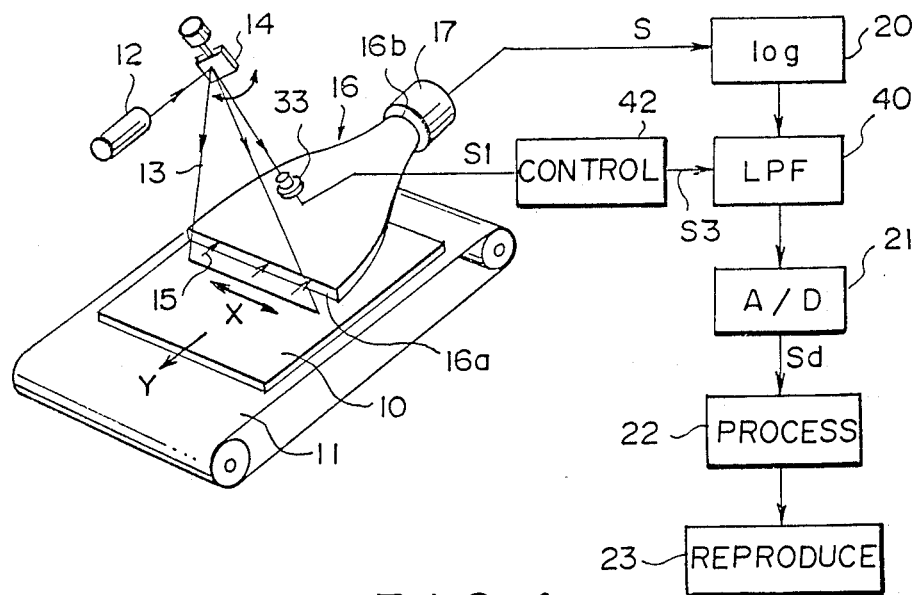

Another embodiment of the radiation image read-out apparatus in accordance with the present invention will hereinbelow be described with reference to FIG. 2. In FIG. 2, similar elements are numbered with the same reference numerals with respect to FIG. 1 (this also applies to FIG. 4). In the embodiment of FIG. 2, the read-out image signal S passing through the logarithmic amplifier 20 is passed through a variable characteristic low-pass filter 40 for removing the high region component (i.e. the high-frequency component) from the read-out image signal S. The control circuit 42 receives the light amount signal S1 from the light amount detector 33, sends a filter characteristic control signal S3 corresponding to the light amount signal S1 to the low-pass filter 40, and changes the characteristics of the low-pass filter 40 to strengthen the high region attenuation characteristics as the light amount of the laser beam 13 becomes low. Specifically, for example, in the case where the characteristics of the low-pass filter 40 are as indicated by the solid line in FIG. 3 when the light amount of the laser beam 13 is comparatively large, the characteristics are changes as indicated by the broken line as the light amount of the laser beam 13 becomes low. When the high region attenuation characteristics of the low-pass filter 40 are strengthened in this manner, the high-frequency component of the read-out image signal S is removed to a higher extent. Therefore, also with this embodiment, the sharpness of the visible radiation image reproduced based on the read-out image signal S becomes low, and deterioration of the graininess is prevented.

In the case where a low-pass filter is disposed for controlling the sharpness of the reproduced visible image, the low-pass filter may be utilized as the low-pass filter 40. In the case where such a low-pass filter is not provided, the low-pass filter 40 should be added to the apparatus. In order to attenuate the high region component of the read-out image signal S, instead of using the low-pass filter 40, a variable frequency response amplifier may be used as the amplifier for amplifying the read-out image signal S, and the frequency response of the amplifier to the high region component may be decreased as the light amount of stimulating rays becomes low.

Figure 4:
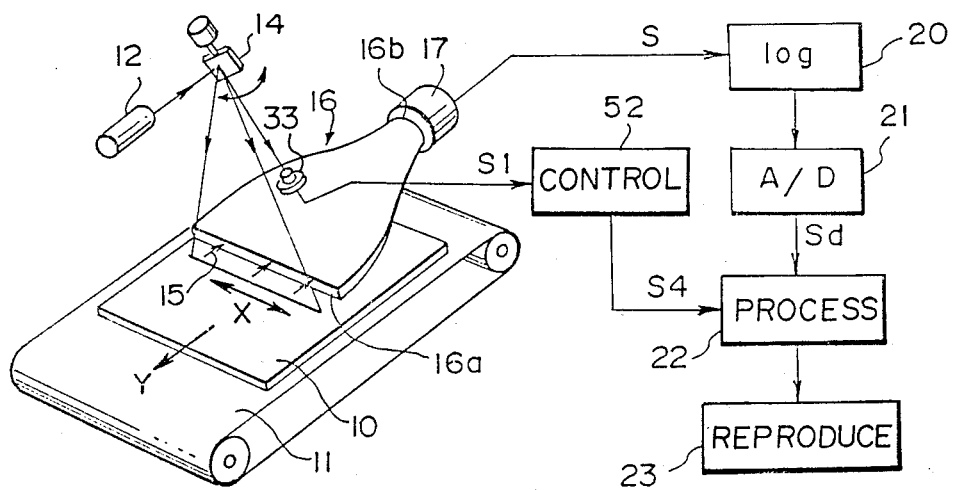
FIG. 4 is a schematic view showing a further embodiment of the radiation image read-out apparatus in accordance with the present invention.

A further embodiment of the radiation image read-out apparatus in accordance with the present invention will hereinbelow be described with reference to FIG. 4. In this embodiment, a control circuit 52 receiving the light amount signal S1 from the light amount detector 33 generates an image processing characteristic control signal S4 in accordance with the light amount signal S1, and sends the image processing characteristic control signal S4 to the image processing circuit 22 for changing the image processing conditions so as to decrease the sharpness of the reproduced visible image. In order to decrease the sharpness in this manner, for example, an emphasis coefficient may be decreased in the case where high region emphasis processing for image sharpening is carried out as image processing, or a mask size may be increased in the case where smoothing processing is carried out as image processing.

In the aforesaid embodiments, the light amount of the deflected laser beam 13 is detected. However, detection of the light amount may also be carried out by splitting the laser beam 13 by a beam splitter before deflection of the laser beam 13, and detecting the light amount of the split laser beam. Or, in the case where a semiconductor laser is used as the laser beam source 12, a photodetector for light amount monitoring disposed ordinarily in the case of the semiconductor laser may be used for detecting the light amount of the laser beam.

I claim:

1. A radiation image read-out apparatus for exposing a stimulable phosphor sheet carrying a radiation image stored thereon to stimulating rays which cause the stimulable phosphor sheet to emit light in proportion to the stored radiation energy, and photoelectrically detecting the light emitted by the portion of the stimulable phosphor sheet exposed to the stimulating rays by use of a photodetector to obtain an image signal representing the radiation image, wherein the improvement comprises the provision of:
p1 (i) a sharpness adjustment means for adjusting sharpness of a visible image reproduced based on said image signal, (ii) a light amount detecting means for detecting the light amount of said stimulating rays, and p1 (iii) a control means for receiving the output of said light amount detecting means, and controlling said sharpness adjustment means in accordance with a decrease in the light amount of said stimulating rays so that said sharpness of said visible image is decreased.

2. An apparatus as defined in claim 1 wherein said sharpness adjustment means is a means for adjusting the beam diameter of said stimulating rays, and said control means controls said beam diameter adjusting means so that said beam diameter of said stimulating rays is increased in accordance with a decrease in the light amount of said stimulating rays.

3. An apparatus as defined in claim 1 wherein said sharpness adjustment means is a means for attenuating the high region component of said image signal, and control means controls said high region component attenuating means so that the attenuation characteristics for said high region component are strengthened in accordance with a decrease in the light amount of said stimulating rays.

4. An apparatus as defined in claim 1 wherein said sharpness adjustment means changes processing characteristics of a device for carrying out image processing of an image signal obtained by digitizing said image signal.

* * * * *